United States Patent [19]

Fujiyoshi et al.

[11] Patent Number: 5,441,312
[45] Date of Patent: Aug. 15, 1995

[54] PIPE JOINT FOR CONNECTION OF CORRUGATED TUBE

[75] Inventors: Minoru Fujiyoshi, Kuwana; Michio Hasegawa, Joetsu; Shinichi Kanomata, Yokohama; Takashi Anamizu, Tokyo; Morio Saito, Tokyo; Fumitaka Satoh, Tokyo, all of Japan

[73] Assignees: Hitachi Metals, Ltd.; Tokyo Gas Co., both of Tokyo; Sanko Gas Seiki, Ltd., Kawaguchi, all of Japan

[21] Appl. No.: 314,264

[22] Filed: Sep. 30, 1994

[30] Foreign Application Priority Data

Oct. 1, 1993 [JP] Japan ................................. 5-246642
Apr. 22, 1994 [JP] Japan ................................. 6-084311

[51] Int. Cl.⁶ ........................ F16L 35/00; F16L 55/00
[52] U.S. Cl. ................................ 285/23; 285/93; 285/322; 285/353; 285/903
[58] Field of Search ................ 285/23, 353, 903, 93, 285/322

[56] References Cited

U.S. PATENT DOCUMENTS

| | | |
|---|---|---|
| 4,630,850 | 12/1986 | Saka . |
| 4,801,158 | 1/1989 | Gomi .................... 285/903 X |
| 4,904,002 | 2/1990 | Sasa et al. .............. 285/903 X |
| 4,907,830 | 3/1990 | Sasa et al. .............. 285/903 X |
| 5,080,405 | 1/1992 | Sasa et al. .............. 285/903 X |
| 5,261,707 | 11/1993 | Kotake et al. ........... 285/903 X |
| 5,292,156 | 3/1994 | Sasa et al. .............. 285/903 X |

Primary Examiner—Dave W. Arola
Attorney, Agent, or Firm—Finnegan, Henderson, Farabow, Garrett & Dunner

[57] ABSTRACT

A pipe joint for connecting a flexible corrugated tube includes a joint body, a sleeve received in an axial through bore in the joint body for holding a free end of the flexible corrugated tube, and a nut threadedly fitted in a threaded portion of the joint body. A shoulder is formed on an inner surface of the through bore, and has an air-tight surface directed toward one end of the through bore. A tapering surface, decreasing in diameter progressively toward the shoulder, is formed on the inner surface of the through bore in adjacent relation to the shoulder. An annular groove of a generally channel-shaped cross-section is formed in the inner surface of the through bore in adjacent relation to the tapering surface. The sleeve has projections extending radially inwardly from one end thereof facing said shoulder, the sleeve having an end surface at the other end thereof. The projections are pivotally movable resiliently relative to the remainder of the sleeve so as to be received in a predetermined one of valleys in the outer peripheral surface of the corrugated tube. The nut has a holding portion for holding outer surfaces of the projections of the sleeve in registry with the annular groove. The nut has a flange surface for abutment against the end surface of the sleeve.

11 Claims, 2 Drawing Sheets

PIPE JOINT FOR CONNECTION OF CORRUGATED TUBE

BACKGROUND OF THE INVENTION

This invention relates to a pipe joint for connecting a flexible tube, having a corrugation on an outer peripheral surface thereof, to another flexible tube or an ordinary tube for flowing a fluid such as gas and water.

One such pipe joint is proposed in U.S. Pat. No. 4,630,850, and has been used. This conventional joint comprises a joint body having an externally-threaded portion formed on an outer peripheral surface thereof at one end portion thereof, a cap nut threadedly fitted on the externally-threaded portion of the joint body, and a sleeve having a corrugated inner peripheral surface for engagement with a corrugated outer peripheral surface of a corrugated tube.

The joint body has an axial tapering bore provided at the one end portion thereof (where the externally-threaded portion is provided) which bore is gently decreasing in diameter progressively toward the other end of the joint body. The joint body also has an axial through bore which is formed in the other end portion thereof, and is smaller in diameter than the tapering bore. A tube receiving wall or shoulder is formed at the boundary between this through bore and the tapering bore.

Axial slits are formed in the sleeve to divide the sleeve into a plurality of segments. The sleeve is fitted on the corrugated tube at a position spaced such a distance from one end of the corrugated tube that several ridges on the outer peripheral surface of the corrugated tube are disposed between the sleeve and the one end of the corrugated tube. Then, the sleeve is inserted into the tapering bore in the joint body, and the cap nut is mounted on the externally-threaded portion of the joint body, and is tightened.

That portion of the corrugated tube projecting from the sleeve is sealed between the end of the sleeve and the tube receiving shoulder of the joint body.

In this pipe joint, a satisfactory seal is formed between the end of the corrugated tube and the tube receiving shoulder of the joint body, and therefore a fluid will not leak from this sealed portion. The sleeve, having the corrugated inner peripheral surface engageable with the corrugated outer peripheral surface of the corrugated tube, is fitted on the outer periphery of the corrugated tube, and this sleeve is fixedly secured to the joint body by the cap nut, and therefore a positive connection of the corrugated tube can be achieved.

However, there may be encountered such an assembling mistake that the end portion of the corrugated tube is completely received within the sleeve, in which case the end portion of the corrugated tube is not projected from the end of the sleeve. Even in this condition, the pipe joint can be assembled, and the cap nut can be tightened. If the pipe joint is thus assembled, the end of the corrugated tube will not be compressed between the end of the sleeve and the tube receiving shoulder of the Joint body, so that a seal is not formed between the end of the corrugated tube and the joint body. This results in leakage of a fluid from this portion.

For connecting the corrugated tube to the above pipe joint, the joint is first disassembled, and the cap nut and the sleeve are fitted on the corrugated tube, and the corrugated tube with the sleeve is inserted into the joint body, and then the cap nut is engaged with the joint body, and is tightened. Several ridges on the end portion of the corrugated tube need to be compressed by tightening the cap nut.

There has been a demand for the type of pipe joint capable of connecting a corrugated tube merely by inserting the corrugated tube thereinto, and various such proposals have been made. However, none of such proposals have proven to be sufficiently reliable in sealing ability. It is possible to insert a corrugated tube into a pipe joint and to mechanically retain the corrugated tube relative to the pipe joint against withdrawal. In such a case, however, since a large pressure is not applied, a satisfactory seal can not be achieved.

SUMMARY OF THE INVENTION

It is therefore an object of this invention to provide a pipe Joint capable of connecting a corrugated tube by inserting the corrugated tube into a joint body and then by tightening a nut without the need for disassembling the pipe joint, the pipe joint being of such a construction that a satisfactory seal can be formed at an area of contact between the pipe joint and the corrugated tube.

Another object of the invention is to provide such a pipe joint in which when the corrugated tube is not inserted sufficiently deep into the pipe joint, the corrugated tube can be easily withdrawn from the pipe joint even after the nut is tightened, so that it can be judged whether or not the connection has been made properly.

According to the present invention, there is provided a pipe joint for connecting a flexible corrugated tube, comprising:

- a joint body having an axial through bore and a threaded portion;
- a sleeve received in the through bore for holding a free end of the flexible corrugated tube, the flexible corrugated tube having alternate ridges and valleys at its outer peripheral surface; and
- a nut threadedly fitted in the threaded portion of the joint body;
- the joint body having a shoulder formed on an inner surface of the through bore, the shoulder having an air-tight sealing surface directed toward one end of the through bore, a tapering surface being formed on the inner surface of the through bore in adjacent relation to the shoulder, the tapering surface being decreasing in diameter progressively toward the shoulder, and an annular groove formed in the inner surface of the through bore in adjacent relation to the tapering surface;
- the sleeve having projections extending radially inwardly from one end thereof facing the shoulder, the sleeve having an end surface at the other end thereof, and the projections being pivotally movable resiliently relative to the remainder of the sleeve so as to be received in a predetermined one of the valleys in the outer peripheral surface of the flexible corrugated tube; and
- the nut having means for holding outer surfaces of the projections of the sleeve in registry with the annular groove, the nut having a flange surface for abutment against the end surface of the sleeve.

When the free end of the corrugated tube is inserted into the sleeve through a bore in the nut of the pipe joint of the present invention, the projections of the sleeve are urged by the ridge of the corrugated tube to be radially outwardly moved into the annular groove, and slide over this ridge. Then, when the nut is tightened, the sleeve is urged toward the shoulder in the through bore in the joint body, and the projections are radially inwardly moved by the tapering surface to compress the free end of the corrugated tube against the air-tight surface of the shoulder, thereby holding the corrugated tube in an air-tight manner.

DESCRIPTION OF THE PREFERRED EMBODIMENT

One preferred embodiment of the present invention will now be described with reference to the drawings.

Figure 1:
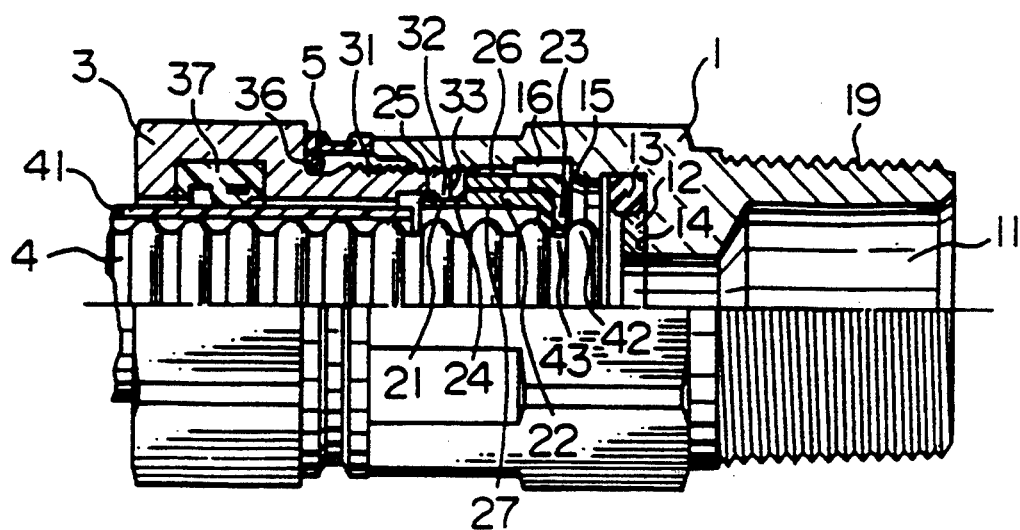
FIG. 1 is a partly cross-sectional, front-elevational view of one preferred embodiment of a pipe joint of the present invention, showing a condition in which a flexible corrugated tube is inserted into the pipe joint, with a nut lightly fitted in the pipe joint.
Figure 2:
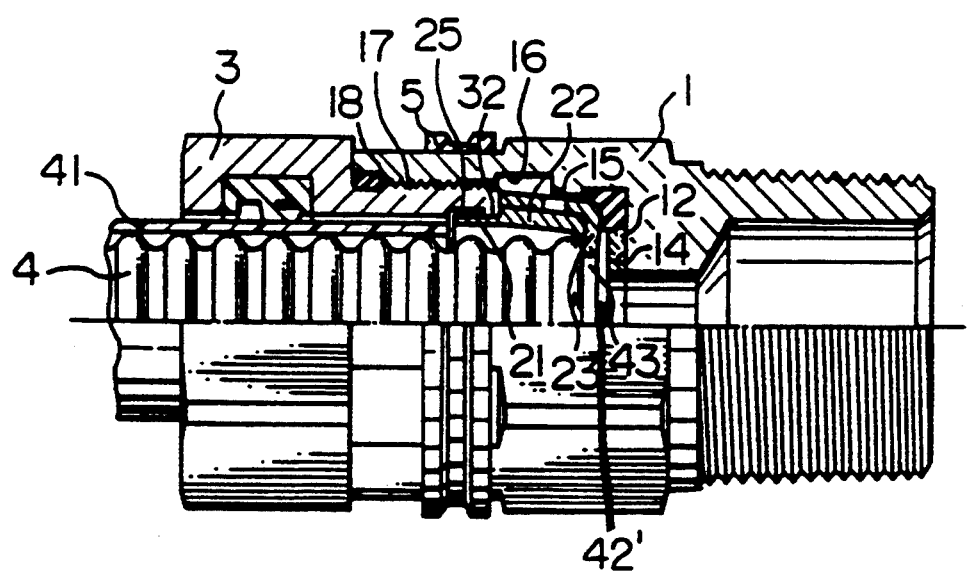
FIG. 2 is a view similar to FIG. 1, but showing the nut in its fully tightened condition.
Figure 3:
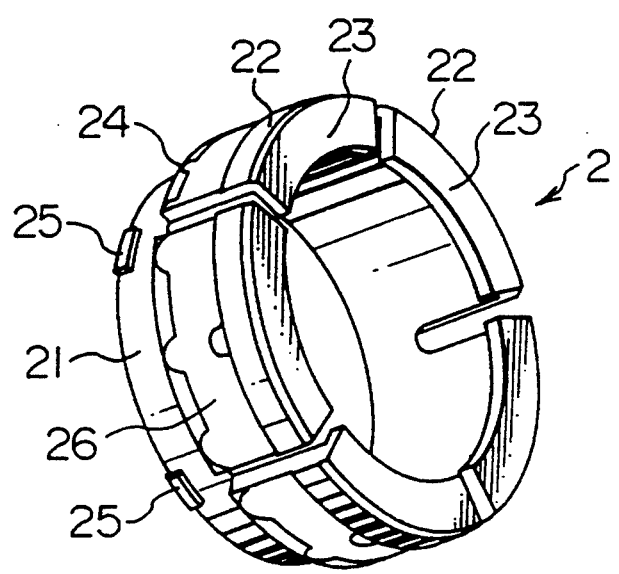
FIG. 3 is a perspective view of a sleeve used in the pipe joint of the invention.

Referring to FIGS. 1 and 2, a joint body 1 has an axial through bore 11, and a shoulder 14, having an air-tight sealing surface (which is directed toward one end (left-hand end in the drawings) of the through bore 11, and has a heat-resistant gasket 12 mounted thereon in the drawings), is formed on an inner surface of the through bore 11. A tapering surface 15, decreasing in diameter progressively toward the shoulder 14, is formed on the inner surface of the through bore 11 in adjacent relation to the shoulder 14, and an annular groove 16 of a channel-shaped cross-section and an internally-threaded portion 17 are provided in this order at the inner surface of the through bore 11 adjacent to the tapering surface 15. A notch 18 for receiving an O-ring 36 is formed in the inner surface of the through bore 11 at one end portion of the joint body 1. An externally-threaded portion 19 for connecting a tube (pipe) thereto is formed on the other end portion of the joint body 1.

A sleeve 2 for receiving and holding a free end portion of a flexible corrugated tube (pipe) 4 is received in the through bore 11 in the joint body 1. The sleeve 2 includes a proximal portion defined by a unitary ring 21, and a distal portion divided by axial slits into a plurality of segments 22. Projections 23 extend radially inwardly from free (front) ends of the segments 22 (facing the shoulder 14 within the through bore 11 in the joint body 1), respectively. A circle, on which distal ends of the projections 23 lie, is smaller in diameter than ridges on an outer periphery of the corrugated tube 4 to be inserted, but is larger than valleys (grooves) in the outer periphery of the corrugated tube 4. The projections 23 and the segments 22 are reinforced at their outer peripheral portions by a brass plate 26 to provide higher rigidity. The ring 21 of the sleeve 2, as well as the inner peripheral portions of the segments 22, is made of a resin 27, so that the projections 23 can be pivotally moved resiliently relative to the ring 21. End surfaces 24 of the segments 22 can receive a large force applied from a nut 3. A plurality of claws 25 are formed on an outer periphery of the ring 21 of the sleeve 2 at a rear end portion thereof, and are engageable with the nut 3.

The nut 3 has a through bore for passing the corrugated tube 4 therethrough, and has an externally-threaded portion 31 formed on an outer peripheral surface thereof at one end portion thereof, the externally-threaded portion 31 being threadedly engageable with the internally-threaded portion 17 of the joint body 1. Claws or an annular projection 32 extend radially inwardly from the inner periphery of the externally-threaded portion 31 at a front end thereof, and are engaged with the claws 25 on the sleeve 2 to prevent the sleeve 2 from axially moving relative to the nut 3. The claws or the annular projection 32 may be provided by forming a groove in an inner periphery of the end portion of the externally-threaded portion 31. The nut 3 and the sleeve 2 are rotatable or slidable relative to each other. The nut 3 is lightly or loosely threaded into the joint body 1, and in this condition, when the sleeve 2 is inserted the deepest relative to the nut 3, the outer peripheries of the projections 23, formed at the front end of the sleeve 2, are held in registry with the annular groove 16. The front end of the externally-threaded portion 31 is formed into a flange surface 33. As the nut 3 is tightened relative to the joint body 1, the flange surface 33 urges the end surfaces 24 of the sleeve 2 axially inwardly.

In this pipe joint, the nut 3 is lightly threaded into the joint body 1, and in this condition, when the front end portion of the flexible corrugated tube 4, from which a front end portion of a resin cover 41 covering several ridges on the front end portion of this corrugated tube 4 is removed, is inserted into the joint body 1 through the axial bore in the nut 3, the front end of the corrugated tube 4 or the ridge 42 on this front end axially inwardly urges the radially inwardly-extending projections 23 formed at the front end of the sleeve 2, so that the sleeve 2 moves into the deepest position in the through bore 11 relative to the nut 3. In this deepest position, the outer peripheries of the projections 23 are disposed in registry with the annular groove 16 in the joint body 1. A force to further urge the sleeve 2 axially inwardly is applied from the front end of the corrugated tube 4 to the projections 23 formed at the front end of the sleeve 2. The segments 22 at the distal portion of the sleeve 2 are pivotally moved resiliently about the unitary ring 21 at the proximal portion of the sleeve 2, so that the projections 23 at the front end of the sleeve 2 are moved radially outwardly, and slide over the ridge 42 of the corrugated tube 4 to become received in the first valley 43. Where the distance between the projections 23 at the front end of the sleeve 2 and the air-tight surface in the joint body 1 is a length corresponding to about one ridge on the corrugated tube 4, the front end of the corrugated tube 4 is brought into engagement with the air-tight surface when the projections 23 of the sleeve 2 become received in the first valley 43 in the outer periphery of the corrugated tube 4, and the corrugated tube 4 can not be inserted any further.

The construction in which the corrugated tube can be thus inserted by one ridge is preferable to a construction in which the corrugated tube can be inserted by several ridges. In the latter construction allowing the insertion by several ridges, it can not be judged whether the corrugated tube is inserted by one ridge, or two ridges or up to the limit after the nut 3 is fully tightened.

In the construction allowing the insertion by one ridge, it can be judged whether or not the corrugated tube is inserted into the limit. Because, under the condition that the projections 23 of the sleeve 2 are received in the first valley 43, the corrugated tube 4 cannot be inserted any further as described above. Under such condition, even if a force to withdraw the corrugated tube 4 from the sleeve 2 is exerted on the tube 4, the tube 4 cannot be withdrawn therefrom since the projections 23 received in the first valley 43 inhibit the withdrawal. This makes it possible to confirm that the corrugated tube 4 has been normally or properly inserted. If the corrugated tube 4 has not been inserted sufficient enough to allow the projections 23 to ride over one ridge of the corrugated tube 4, the corrugated tube 4 is withdrawn when a force to withdraw the tube 4 is applied thereto. Thus, if the corrugated tube 4 is withdrawn, it is confirmed that the tube 4 was not sufficiently inserted and hence should have been further inserted or pushed in. Here, the term "about one ridge" means the distance ranging from 0.5 ridge to 1.5 ridges.

Where the distance between the projections 23 at the front end of the sleeve 2 and the air-tight surface in the joint body 1 is a length corresponding to about two ridges on the corrugated tube 4, the projections 23 are first received in the first valley in the outer periphery of the corrugated tube 4, and then when the corrugated tube 4 is further inserted, the projections 23 at the front end of the sleeve 2 are urged radially outwardly by the second ridge. As a result, the segments 22 of the sleeve 2 are pivotally moved resiliently, so that the projections 23 at the front end of the sleeve 2 are moved radially outwardly to slide over the second ridge of the corrugated tube 4 to become received in the second valley.

After the corrugated tube 4 is thus inserted into the sleeve 2 of the pipe joint, a force tending to withdraw the corrugated tube 4 from the sleeve 2 may be exerted on the corrugated tube 4. In such a case, the sleeve 2 is pulled to axially slide toward the nut 3 in such a manner that the ridge 42 at the front end of the corrugated tube 4 is engaged with the projections 23 at the front end of the sleeve 2. The sleeve 2 is stopped when the end surfaces 24 of the sleeve 2 are brought into abutment against the flange surface 33 of the nut 3.

When the sleeve 2 is returned to this position, the outer peripheries of the segments 22 of the sleeve 2 are spaced from the annular groove 16 in the joint body 1, and are disposed at a constricted portion of the through bore 11 or at the internally-threaded portion 17. In this position, when trying to withdraw the corrugated tube 4, the inner or distal ends of the projections 23 are engaged with the ridge 42 of the corrugated tube 4, so that the segments 22 of the sleeve 2 tend to be pivotally moved resiliently about the unitary ring 21. However, since the inner diameter of that portion of the joint body 1 disposed around the segment portion 22 is smaller, the projections 23 at the front end of the sleeve 2 will not be moved radially outwardly, thereby preventing the corrugated tube 4 from being withdrawn.

Here, if trying to forcibly withdraw the corrugated tube 4, the projections 23 of the sleeve 2 are pulled in the axial direction, that is, the direction of withdrawing of the corrugated tube 4, so that the segments 22 are bent inwardly to increase the inner diameter of the front end of the sleeve 2 defined by the free ends of the projections 23, thus enabling the withdrawal of the corrugated tube 4. However, this is not desirable since the segments 22 are bent by the undue force applied thereto.

After the corrugated tube 4 is inserted into the sleeve 2 of the pipe joint, the nut 3 is turned to cause the externally-threaded portion 31 to threadedly move along the internally-threaded portion 17 of the joint body 1. The nut 3 can be turned lightly until the flange surface 33 of the nut 3 is brought into abutment against the end surfaces 24 of the sleeve 2. After the flange surface 33 of the nut 3 abuts against the end surfaces 24 of the sleeve 2, the sleeve 2 is urged by the nut 3 to move axially inwardly along the through bore 11 in the joint body 1 in accordance with the tightening of the nut 3. It is herein to be noted that, since the nut 3 and the sleeve 2 are rotatable relative to each other, the twisting or torsion of the sleeve does not occur during tightening of the nut 3. The tapering surface 15 is formed on the inner surface of the through bore 11 in the joint body 1, and this tapering surface 15 is decreasing in diameter progressively inwardly. Therefore, at this time, the outer periphery of the front end of the sleeve 2 is gradually decreasing in diameter. The radially inwardly-extending projections 23 at the front end of the sleeve 2 are received in the first or the second valley 43 in the outer peripheral surface of the corrugated tube 4, and therefore as the sleeve 2 advances deeper or inwardly, the projections 23 of the sleeve 2 radially contract the valley 43 in which the projections 23 are received. Also, the projections 23 of the sleeve 2 press the ridge 42, over which the projections 23 have slid, against the air-tight surface of the shoulder 14 to compress the same.

FIG. 2 shows the deformed end ridge designated 42' of corrugated tube 4 resulting from the compression.

The air-tight surface of the shoulder 14 of the joint body 1 may be a flat metal surface, or may be a surface having an annular projection axially formed thereon. An air-tight seal can be formed and maintained between this air-tight metal surface and the compressed end surface of the corrugated tube 4. As shown in the drawings, the heat-resistant gasket 12 can be provided on the shoulder 14 of the joint body 1 to enhance the air-tightness. Further, a rubber packing 13, containing expanded graphite, can be mounted on the outer periphery of the heat-resistant gasket 12 for the purpose of enhancing safety in the event of a fire.

If the nut 3 is tightened relative to the joint body 1, with the corrugated tube 4 not sufficiently inserted in the sleeve 2, the sleeve 2 is forced inwardly along the tapering surface 15; however, since the sleeve 2 is not engaged with the ridge of the corrugated tube 4, the corrugated tube 4 can be easily removed or withdrawn from the joint body 1 even after the nut 3 is tightened. It can be easily judged from this that the proper connection has not been made.

In the pipe joint of the present invention, the nut 3 is loosely attached to the joint body 1, and in this condition the annular projection 32 at the front end of the nut 3 is engaged with the claws 25 at the rear end of the sleeve 2 to position the sleeve 2, and in this position, the front end of the sleeve 2 at which the radially-inwardly extending projections 23 are formed must be disposed in registry with the radially inwardly-open, annular groove 16 formed in the inner peripheral surface of the joint body 1. Therefore, in the loosely-attached condition of the nut 3, it is important to determine the position of the nut 3 relative to the joint body 1, that is, to determine the degree of threaded engagement of the threaded portion 31 of the nut 3 relative to the threaded portion 17 of the joint body 1.

Therefore, in order to determine the position of the nut 3, a spacer ring 5 of a generally C-shape is provided between the front end surface of the nut 3 and the rear end surface of the joint body 1, and the nut 3 is tightened relative to the joint body 1. In this condition, when the sleeve 2 is inserted into the deepest position, the outer peripheral portion of the front end of the sleeve 2 is disposed in registry with the annular groove 16 in the joint body 1, and the distance between the front end of the sleeve 2 and the air-tight surface of the shoulder 14 of the joint body 1 corresponds to the length of about one ridge or about two ridges on the corrugated tube 4.

This spacer ring 5 is made, for example, of an elastic plastics material, and an axial notch is formed in part of the peripheral wall of the spacer ring 5.

When the nut 3 is lightly tightened relative to the joint body 1, the spacer ring 5 is sandwiched between the opposed end surfaces of the nut 3 and the joint body 1, thereby determining the position of the nut 3. However, when the nut 3 is tightened heavily, the spacer ring 5 is broken at its notch, and is displaced from the end surfaces of the nut 3 and the joint body 1 to be disposed on the outer periphery of the joint body 1. Alternatively, after the corrugated tube 4 is inserted, the spacer ring 5, provided between the opposed end surfaces of the nut 3 and the joint body 1, can be removed by the hand. The nut 3 can be tightened in this manner.

The cover 41 of a resin such as vinyl chloride is often mounted on the corrugated tube 4 in order to provide an enhanced weathering resistance and also to prevent external damage. In such a case, the cover 41 is removed from the front end portion of the corrugated tube 4 over a length corresponding to 4 to 5 ridges, and then the corrugated tube 4 is inserted into and connected to the pipe joint of the present invention.

The O-ring 36 is provided adjacent to the threaded portions 31 and 17 of the nut 3 and the joint body 1, and a packing 37 of an E-shape is interposed between the outer periphery of the resin cover 41 and the inner periphery of the nut 3. These seals prevent water or moisture from intruding into the interior of the pipe joint.

In the pipe joint of the present invention, the connection of the corrugated tube can be made by inserting the corrugated tube into the joint body and then by tightening the nut without disassembling the pipe joint including the joint body, the nut and so on. And besides, the pipe joint provides a satisfactory sealing effect at its area of contact with the corrugated tube. If the corrugated tube is not fully inserted, the corrugated tube can be easily withdrawn even after the nut is tightened, and it can be judged from this whether or not the proper connection has been made. Therefore, the proper connection can always be carried out.

What is claimed is:

1. A pipe joint for connecting a flexible corrugated tube, the tube having a free end and alternate ridges and valleys at its outer peripheral surface adjacent the free end, the joint comprising:

a joint body having an axial through bore and a threaded portion;

a sleeve received in said through bore for holding the free end of the flexible corrugated tube; and a nut threadedly fitted in said threaded portion of said joint body;

said joint body having a shoulder formed on an inner surface of said through bore, said shoulder having a sealing surface directed toward one end of said through bore for abuttingly engaging the free end of the tube when the tube is fully inserted, a tapering surface being formed on the inner surface of said through bore in adjacent relation to said shoulder, said tapering surface being decreasing in diameter progressively toward said shoulder, and a radially inwardly-open, annular groove formed in the inner surface of said through bore in adjacent relation to said tapering surface;

said sleeve having projections extending radially inwardly from one end thereof facing said shoulder, said sleeve having an end surface at the other end thereof, and said projections being pivotally movable resiliently relative to the remainder of said sleeve so as to be received in a predetermined one of the valleys in the outer peripheral surface of the flexible corrugated tube when the tube free end is fully inserted; and said nut having means for holding outer surfaces of said projections of said sleeve in registry with said annular groove during insertion of the tube free end, said annular groove being sized radially to accept pivoting movement of said projections during passage of at least the ridge adjacent the tube free end, said nut having a flange surface for abutment against said end surface of said sleeve, wherein when the nut is tightened following full insertion of the tube free end, said sleeve is caused to move axially relative to said joint body, said projections are caused to pivot inwardly by engagement with said tapering surface, and at least the ridge adjacent the tube free end is compressed between said sealing surface and said projections.

2. A pipe joint according to claim 1, in which said holding means is defined by first claws formed on one end of said nut, said first claws being engaged with second claws formed on said sleeve when said sleeve is inserted into the deepest position in said through bore relative to said nut.

3. A pipe joint according to claim 1, further including a spacer member for positioning said nut before said nut, threadedly fitted in said threaded portion of said joint body, is fully tightened said spacer member being interposed between said nut and said joint body.

4. A pipe joint according to claim 3, in which before said nut, threadedly fitted in said threaded portion of said joint body, is fully tightened, said spacer member sets the distance between said projections at said one end of said sleeve and said sealing surface of said shoulder equal to the length of about one ridge of said corrugated tube.

5. A pipe joint according to claim 3, in which said positioning member is a spacer ring of a generally C-shape.

6. A pipe joint according to claim 3, wherein said spacer member is removably interposed between said nut and said joint body.

7. A pipe joint according to claim 6, wherein said spacer element is retained by said joint body when not interposed.

8. A pipe joint according to claim 6, wherein said spacer member is separable from said pipe joint when not interposed.

9. A pipe joint according to claim 1, in which said threaded portion of said joint body is an internally-threaded portion disposed adjacent to said annular groove.

10. A pipe joint according to claim 1, wherein said annular groove is dimensioned axially so that said outer surfaces of said projections move out of registration with said annular groove when at least the ridge adjacent the tube free end is compressed.

11. An assembly including a length of flexible corrugated tube having a free end held in the pipe joint according to claim 1.

* * * * *

UNITED STATES PATENT AND TRADEMARK OFFICE
CERTIFICATE OF CORRECTION

PATENT NO. : 5,441,312
DATED : August 15, 1995
INVENTOR(S) : M. FUJIYOSHI et al.

It is certified that error appears in the above-indentified patent and that said Letters Patent is hereby corrected as shown below:

Title page, col. 1, under "Assignees", second Assignee "Tokyo Gas Co." should read --Tokyo Gas Co., Ltd.--

Signed and Sealed this

Tenth Day of October, 1995

Attest:

BRUCE LEHMAN

Attesting Officer     Commissioner of Patents and Trademarks